US008698371B2

United States Patent
Komada et al.

(10) Patent No.: US 8,698,371 B2
(45) Date of Patent: Apr. 15, 2014

(54) ROTOR AND METHOD OF MANUFACTURING THE ROTOR

(75) Inventors: Masaya Komada, Toyota (JP);
Masayuki Matsushita, Nisshin (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 378 days.

(21) Appl. No.: 13/201,913

(22) PCT Filed: Mar. 15, 2010

(86) PCT No.: PCT/JP2010/054296
§ 371 (c)(1),
(2), (4) Date: Aug. 17, 2011

(87) PCT Pub. No.: WO2011/114414
PCT Pub. Date: Sep. 22, 2011

(65) Prior Publication Data
US 2011/0316382 A1 Dec. 29, 2011

(51) Int. Cl.
*H02K 1/30* (2006.01)
*H02K 15/02* (2006.01)

(52) U.S. Cl.
USPC .............................. 310/216.004; 310/216.136

(58) Field of Classification Search
USPC ................... 310/216.004, 216.058, 216.121, 310/216.136
See application file for complete search history.

(56) References Cited

U.S. PATENT DOCUMENTS

| | | | |
|---|---|---|---|
| 6,700,256 B2 * | 3/2004 | Fukutani et al. | 310/90 |
| 6,710,477 B2 * | 3/2004 | Lau | 310/43 |
| 2001/0033113 A1 * | 10/2001 | Takano | 310/67 R |
| 2009/0140598 A1 * | 6/2009 | Schieweck et al. | 310/217 |

FOREIGN PATENT DOCUMENTS

| | | |
|---|---|---|
| JP | 50-148803 A | 11/1975 |
| JP | 53-141410 U | 11/1978 |
| JP | 62-004850 U | 1/1987 |
| JP | 05-122875 A | 5/1993 |
| JP | 08-237914 A | 9/1996 |
| JP | 09-168258 A | 6/1997 |
| JP | 10-257723 A | 9/1998 |
| JP | 2000-116046 A | 4/2000 |
| JP | 2001-057747 A | 2/2001 |

(Continued)

OTHER PUBLICATIONS

International Search Report & Written Opinion of PCT/JP2010/054296 issued Jun. 15, 2010.

(Continued)

*Primary Examiner* — Tran Nguyen
(74) *Attorney, Agent, or Firm* — Kenyon & Kenyon LLP

(57) ABSTRACT

A rotor includes a core made of a laminated steel sheet assembly including a plurality of laminated magnetic steel sheets each having a flat plate shape, the core including a through hole at a rotation center, a shaft inserted in a through hole of the core, an inner-peripheral-side welded part located on an inner peripheral side of the core, the welded part being a welded section joining between adjacent steel sheets and joining the laminated steel sheet assembly to the shaft over a laminating direction, and an outer-peripheral-side welded part located on an outer peripheral side of the core and in an end part in the laminating direction, the welded part being a welded section joining between some of the magnetic steel sheets, the joined steel sheets including a steel sheet forming an end face of the core in the laminating direction.

15 Claims, 10 Drawing Sheets

(56) References Cited

FOREIGN PATENT DOCUMENTS

| JP | 2002-369424 A | 12/2002 |
|----|---------------|---------|
| JP | 2003-304670 A | 10/2003 |
| JP | 2006-254662 A | 9/2006 |
| JP | 2007-282392 A | 10/2007 |
| JP | 2008-109804 A | 5/2008 |
| JP | 2008-154436 A | 7/2008 |
| WO | 2011/042984 A1 | 4/2011 |

OTHER PUBLICATIONS

International Preliminary Report on Patentability of PCT/JP2010/054296 issued Jun. 28, 2011.

* cited by examiner

ROTOR AND METHOD OF MANUFACTURING THE ROTOR

CROSS-REFERENCE TO RELATED APPLICATIONS

This is a 371 national phase application of PCT/JP2010/054296 filed on Mar. 15, 2010, the entire contents of which are incorporated herein by reference.

TECHNICAL FIELD

The present invention relates to a rotor including a core made of a laminated steel sheet assembly and a rotation transmitting member for transmitting rotation of the core to the outside or rotation from the outside to the core, and a method of manufacturing the rotor.

BACKGROUND ART

Heretofore, a rotor to be used in a rotary machine includes a core and a rotation transmitting member fixed to the core. The core is made of a laminated steel sheet assembly consisting of magnetic (electromagnetic) steel sheets laminated or stacked. The rotation transmitting member is for example a shaft for a rotary electric machine of an inner rotor type.

For appropriately transmitting rotation of the rotation transmitting member to the core, the rotor must be configured such that the core and the rotation transmitting member are surely fixed to each other. To be concrete, it is necessary to prevent the rotation between the magnetic steel sheets constituting the core, the rotation between the core and the shaft about their axis, and the slippage of the core in a laminating direction (the axial direction of the shaft).

A technique for joining components constituting the rotor is for example disclosed in Patent Document 1 in which a rotor is configured such that an end face of a core in a laminating direction is welded to a shaft. Further, Patent Document 2 discloses a rotor configured such that a plurality of magnetic steel sheets are partially bent, and then the inner peripheral surfaces of the steel sheets are welded to join or connect between the steel sheets.

RELATED ART DOCUMENTS

Patent Documents

Patent Document 1: JP10(1998)-257723A
Patent Document 2: JP2008-154436A

DISCLOSURE OF THE INVENTION

Problems to be Solved by the Invention

However, the aforementioned conventional rotors have the following problems. That is, even when the core end face in the laminating direction is welded to the shaft as disclosed in Patent Document 1, a middle part of the core in the lamination direction could not be sufficiently joined to the shaft. On the other hand, even when the magnetic steel sheets are joined to each other over the laminating direction of the core as disclosed in Patent Document 2, each steel sheet could not be sufficiently joined to the shaft.

Therefore, it is conceivable that, as shown in FIG. 10, magnetic steel sheets 21 are joined to each other on the inner peripheral side of the core 11 over the laminating direction of the core 11 (the axis direction of the shaft 12) and also the steel sheets are joined to the shaft 12 at a welded portion 29. However, in the case where the steel sheets 21 are welded to the shaft 12, it takes long to weld them. Thus, there occurs a concern about welding heat. For instance, each steel sheet 21 constituting the core 11 is a thin flat plate and may be deformed due to the welding heat. In particular, magnetic steel sheets 21U and 21L forming end faces of the core 11 in the laminating direction are liable to warp, resulting in core opening as shown by circles depicted with dotted lines in FIG. 10.

The present invention has been made to solve the above problems of the conventional rotors and has a purpose to provide a rotor with a rotation transmitting member fixed to a core therein while preventing the core opening, and a manufacturing method of the rotor.

Means of Solving the Problems

To achieve the above purpose, one aspect of the invention provides a rotor comprising: a core made of a laminated steel sheet assembly including a plurality of laminated magnetic steel sheets each having a flat plate shape, the core being formed with a through hole at a rotation center; a rotation transmitting member inserted in the through hole of the core; an inner-peripheral-side welded part provided on an inner peripheral side of the core to join between the magnetic steel sheets constituting the laminated steel sheet assembly, the inner-peripheral-side welded part being a welded section that joins the laminated steel sheets to the rotation transmitting member over a laminating direction of the magnetic steel sheets; and an outer-peripheral-side welded part provided on an outer peripheral side of the core and at an end in the laminating direction, the outer-peripheral-side welded part being a welded section that joins between the steel sheets including a steel sheet forming an end face of the core in the laminating direction.

The above rotor is configured such that the magnetic steel sheets are joined to each other and to the rotation transmitting member by welding of the inner peripheral side of the rotor (the inner-peripheral-side welded part). By this welding of the inner peripheral side, it is possible to prevent all of the rotation between the magnetic steel sheets, the rotation between the core and the rotation transmitting member about their axis, and the slippage between them in the laminating direction. In the above rotor, some of the magnetic steel sheets, including at least magnetic steel sheets forming an end face in the laminating direction, are joined to each other by welding of the outer peripheral side of the rotor (the outer-peripheral-side welded part). That is, the magnetic steel sheets in the end part of the core in the laminating direction are welded to each other. By this outer-peripheral-side welding, it is possible to prevent outer edges of the magnetic steel sheets from becoming deformed, thereby restraining the core opening. Further, the outer-peripheral-side welded part is provided in a part of the core in the laminating direction, not throughout the laminating direction. Thus, little influence is exerted on an electromagnetic circuit.

In the above rotor, preferably, the inner-peripheral-side welded part includes a welding start portion and a welding end portion both located within the core in the laminating direction. Specifically, it is preferable that the inner-peripheral-side welded part does not extend beyond the core in the laminating direction. With this configuration, downsizing of the rotor in the laminating direction can be achieved.

In the above rotor, preferably, the welding start portion and the welding end portion of the inner-peripheral-side welded part overlap the outer-peripheral-side welded part in a positional relation in the laminating direction. Specifically, when the inner-peripheral-side welded part is provided so as not to extend beyond the core, the welding start portion and the welding end portion which are the bead unstable areas are located within the core. This may cause quality deterioration of a joined state. Therefore, in a positional relation in the laminating direction, the welding start portion and the welding end portion of the inner-peripheral-side welded part are located to overlap the outer-peripheral-side welded parts in order to ensure the quality of joining between the magnetic steel sheets in the welding start portion and the welding end portion. As a result, the entire rotor can have good joining quality.

In the above rotor, preferably, the outer-peripheral-side welded part is provided in at least two places on the outer periphery of the core respectively so that the outer-peripheral-side welded parts are located at equal intervals in an outer periphery direction of the core. Since the outer-peripheral-side welded parts are arranged at equal intervals in the outer periphery direction, it can be expected to reduce defects such as vibrations which may be caused due to the outer-peripheral-side welded parts during rotor rotation.

In the above rotor, preferably, the outer-peripheral-side welded part is not located on a line extending radially from the inner-peripheral-side welded part toward the outer peripheral side of the core. Since the outer-peripheral-side welded part and the inner-peripheral-side welded part are displaced in phase, it can be expected to reduce defects such as vibrations which may be caused due to welded sections.

In the above rotor, preferably, the outer-peripheral-side welded part is located on a line extending radially from a midpoint between adjacent inner-peripheral-side welded parts in the inner periphery direction toward the outer peripheral side of the core. Specifically, in the periphery direction of the core, a middle part between adjacent inner-peripheral-side welded parts in the inner periphery direction of the magnetic steel sheet tends to warp most largely. Therefore, the relevant part is fixed by the outer-peripheral-side welded part, so that warping of the steel sheet is effectively prevented.

In the above rotor, preferably, the core is formed with a groove extending in the laminating direction from the end face of the core in the laminating direction, and the outer-peripheral-side welded part is located in the groove. With this configuration, it can be expected to avoid the outer-peripheral-side portion from protruding from the outer periphery of the core, thereby preventing deterioration of power performance of a motor.

In the above rotor, preferably, the outer-peripheral-side welded part includes: a first outer-peripheral-side welded part located on the outer peripheral side and at one end of the core in the laminating direction, the first outer-peripheral-side welded part being a welded section that joins between some of the magnetic steel sheets including the magnetic steel sheet forming one end face of the core in the laminating direction; and a second outer-peripheral-side welded part located on the outer peripheral side and at the other end of the core in the laminating direction, the second outer-peripheral-side welded part being a welded section that joins between some of the magnetic steel sheets including the magnetic steel sheet forming the other end face of the core in the laminating direction. Specifically, since the outer periphery of the core is welded in both end parts in the laminating direction, the core can be prevented from entirely opening.

Another aspect of the invention provides a method of manufacturing a rotor including: a core made of a laminated steel sheet assembly including laminated magnetic steel sheets each having a flat plate shape and formed with a through hole at a rotation center; and a rotation transmitting member inserted in the through hole of the core, the method comprising: an outer-peripheral-side welding process of welding an outer peripheral side of the core in a laminating direction and joining between some of the magnetic steel sheets of the laminated steel sheet assembly, the joined magnetic steel sheets including a magnetic steel sheet forming an end face of the core in the laminating direction; and an inner-peripheral-side welding process of welding an inner peripheral side of the core over the laminating direction to join between the steel sheets constituting the laminated steel sheet assembly and join the core to the rotation transmitting member.

Effects of the Invention

According to the invention, it is possible to achieve a rotor with a rotation transmitting member fixed to a core while preventing the core widening, and a manufacturing method of the rotor.

MODE FOR CARRYING OUT THE INVENTION

A detailed description of a preferred embodiment of a rotor embodying the present invention will now be given referring to the accompanying drawings. In this embodiment, the invention is applied to an inner rotor in which a core made of a laminated steel sheet assembly consisting of a plurality of laminated or stacked magnetic steel sheets is fixed to a shaft.

<Configuration of Rotor>

Figure 1:
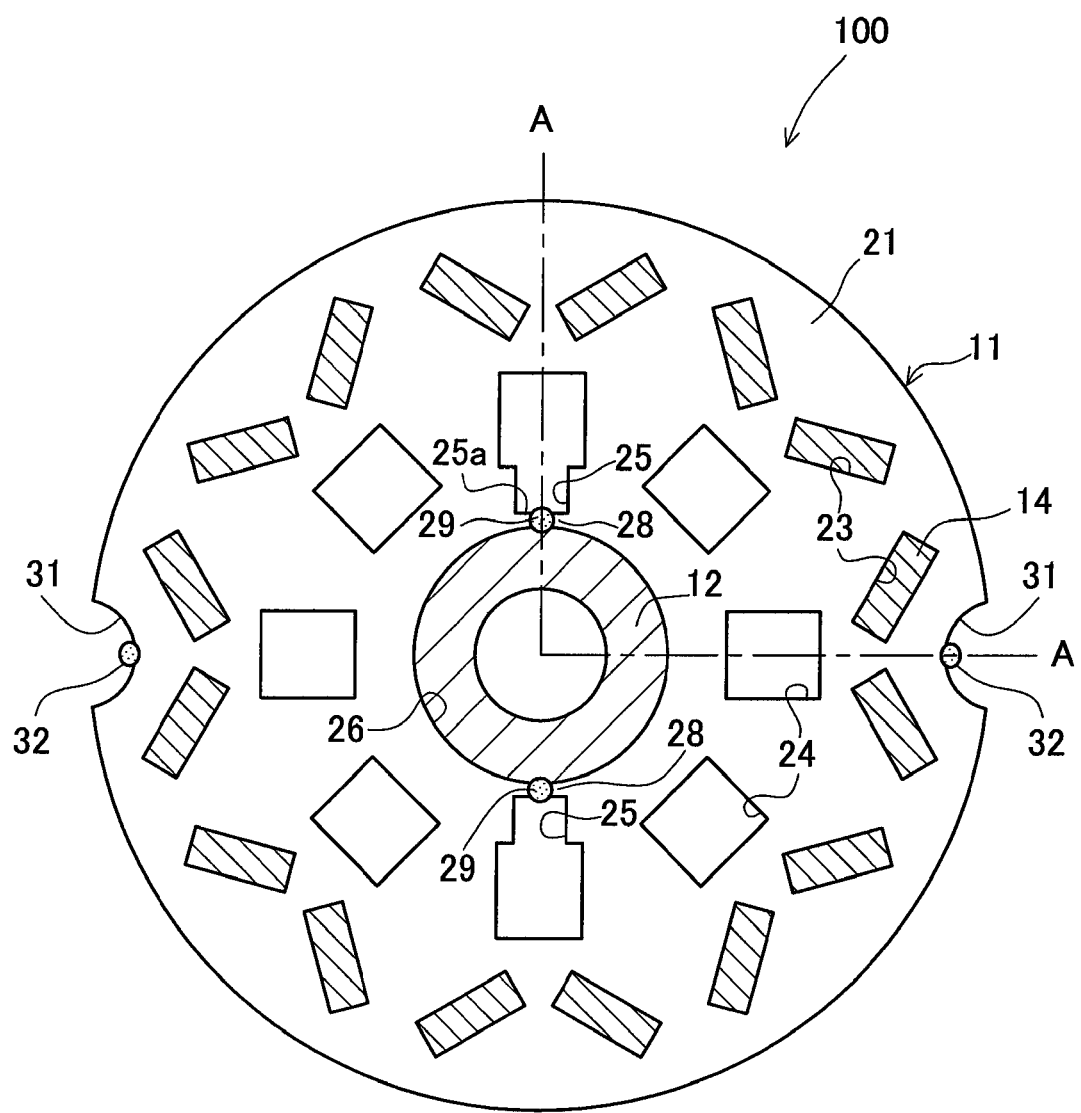
FIG. 1 is a cross sectional view of a rotor in an embodiment.
Figure 2:
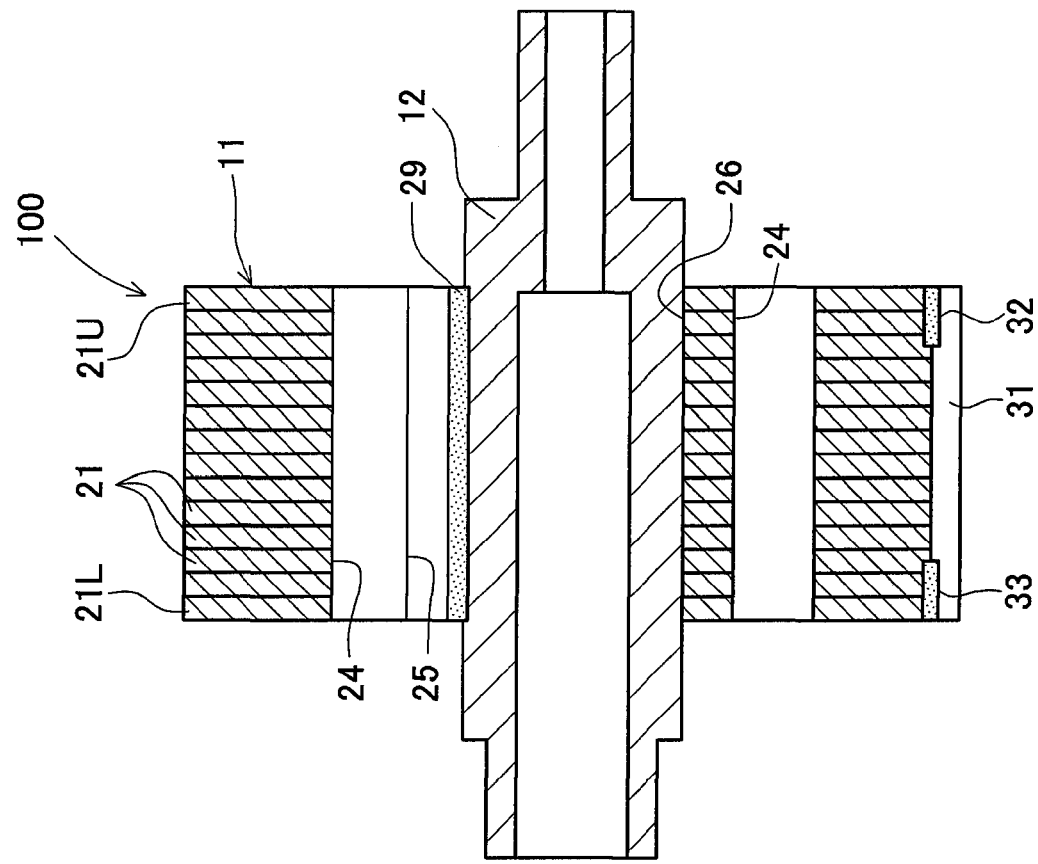
FIG. 2 is a cross sectional view of the rotor taken along a line A-A in FIG. 1.

A configuration of a rotor 100 in this embodiment will be first described referring to FIGS. 1 and 2. FIG. 1 shows a cross section of a core viewed from a laminating direction (the same as an axial direction of a shaft). FIG. 2 is a cross sectional view taken along a line A-A in FIG. 1.

The rotor 100 in this embodiment includes a core 11 and a shaft 12 to which the core 11 is fixed as shown in FIGS. 1 and 2. The core 11 is made of a plurality of magnetic steel sheets 21 each having a flat plate shape. In this core 11, permanent magnets 14 are embedded in predetermined positions. That is, the rotor 100 is to be used in a motor of an interior permanent magnet (IPM) type and inner-rotor type.

Further, the core 11 is formed with a plurality of through holes 23, 24, 25, and 26 as shown in FIG. 1. In other words, each magnetic steel sheet 21 is formed with through holes corresponding tot the through holes 23, 24, 25, and 26 respectively. The steel sheets 21 are laminated or stacked so that respective through holes are aligned.

The through holes 23 for magnets are arranged on an outermost peripheral side of those through holes. In each through hole 23, a permanent magnet 14 is embedded to penetrate through the core 11 in the laminating direction. The through holes 23 are distributed evenly in almost all directions. In the core 11 in the present embodiment, there are formed sixteen through holes 23 in total.

Further, a plurality of the through holes 24 for weight reduction are arranged more inside than the through holes 23 in the core 11 as shown in FIG. 1. The through holes 24 are voids to reduce the weight of the core 11. In addition, the through holes 25 are formed in two, upper and lower, positions in FIG. 1 so that each through hole 25 is continuous from a corresponding through hole 24 toward the inner peripheral side.

In a rotation center of the core 11, the through hole 26 for shaft is formed. This through hole 26 is designed with such a diameter as to permit the shaft 12 to be just fitted therein. Thus, there is little gap between a wall surface defining the through hole 26 (i.e., the inner peripheral surface of the core 11) and a side surface of the shaft 12 (i.e., the outer peripheral surface of the shaft 12). FIGS. 1 and 2 show a state where the shaft 12 is inserted through the core 11.

Each through hole 25 for welding is formed very close to the through hole 26 for shaft. To be concrete, a wall face 25a of each through hole 25, located inside (close to the through hole 26 for shaft), is formed in a position adjacent to a wall face of the through hole 26. In addition, a bridge portion 28 is provided between each wall face 25a of the welding through hole 25 and the through hole 26 for shaft. Specifically, the bridge portions 28 partition the through holes 25 for welding and the through hole 26 for shaft.

Further, each bridge portion 28 is formed with an inner-peripheral-side welded part 29 which is a weld trace. Each welded part 29 extends through the bridge portion 28, extending from the wall face 25a to a part of the shaft 12. Each welded part 29 is also linearly formed over the core 11 in the laminating direction as shown in FIG. 2. Specifically, each welded part 29 is formed in the entire core 11 to extend throughout its length in the axial direction of the shaft 12.

The inner-peripheral-side welded parts 29 represent that, in all the magnetic steel sheets 21 constituting the core 11, the bridge portions 28 and a part of the surface of the shaft 12 have been welded and melted together into an integral structure. The welded parts 29 also represent that the steel sheets 21 constituting the core 11 have been made integral with each other through the bridge portions 28 melted together. Such welded parts 29 can prevent all of the rotation between the adjacent steel sheets 21 of the core 11, the rotation of the core 11 around the shaft 12, and the slippage of the core 11 in the axial direction of the shaft 12.

In addition, on the outer periphery of the core 11, grooves 31 are formed in two, right and left, locations in FIG. 1. Each groove 31 extends along the laminating direction. This groove 31 is formed to extend from an upper end to a lower end along the laminating direction as shown in FIG. 2. That is, each magnetic steel sheet 21 is formed with cutouts corresponding to the grooves 31 and the steel sheets 21 are laminated with respective cutouts aligned with each other.

In both end parts of each groove 31 in the laminating direction, outer-peripheral-side welded parts 32 and 33 which are welded traces are formed. The welded part 32 extends in a range of about 5 to 10 mm from an upper surface of the core 11 in the laminating direction. In this embodiment, this range corresponds to the total thickness of ten to twenty magnetic steel sheets 21 (the thickness of one steel sheet 21 is about 0.5 mm) including a magnetic steel sheet 21U forming an upper end face. FIG. 2 schematically shows a lamination state of the steel sheets 21, in which the outer-peripheral-side welded parts 32 are provided to join about three steel sheets 21; however, more than three steel sheets 21 are actually joined by the welded part 32. The welded part 32 represents that the steel sheets 21 located in an upper end part in the laminating direction (in the present description, the steel sheets located in an "end part" in the laminating direction assume several steel sheets including the steel sheet forming an end face of the core 11) are melted by about 1 mm in depth by welding on the side surfaces defining the groove 31, so that the adjacent steel sheets 21 are melted together into an integral structure.

The outer-peripheral-side welded part 33 extends in a range of about 5 to 10 mm from a lower surface of the core 11 in the laminating direction. In this embodiment, this range corresponds to the total thickness of ten to twenty magnetic steel sheets 21 including a magnetic steel sheet 21L forming a lower end face. The welded part 33 represents that the steel sheets 21 located in a lower end part in the laminating direction are melted by about 1 mm in depth by welding on the side surface defining the groove 31, so that the adjacent steel sheets 21 are melted together into an integral structure.

In the rotor 100 in this embodiment, the outer periphery of the core 11 in both end parts in the laminating direction are fixed by the outer-peripheral-side welded parts 32 and 33. Accordingly, during after-mentioned welding of the inner-peripheral-side welded part 29, it is possible to prevent the core opening caused by warping of the magnetic steel sheets 21.

Since the outer-peripheral-side welded parts 32 and 33 are formed in the groove 31, they do not protrude from the outer periphery of the core 11, thus having little influence on the rotation of the rotor 100. Further, the welded parts 32 and 33 are provided only in both end parts of the core 11 in the laminating direction and the welded parts 32 and 33 are not such welded traces extending over the length of the entire core 11. Therefore, magnetic fluxes straddle the welded trace in a smaller range as compared with a configuration that a welded trace is formed on the outer peripheral side overall the laminating direction. Thus, the influence on an electromagnetic circuit is small. As a result, the influence on power performance of the motor is held down.

In the present embodiment, the inner-peripheral-side welded parts 29 are provided in two places spaced in the inner periphery direction, but may be formed in a single place or in three or more places. In the present embodiment, the outer-peripheral-side welded parts 32 are provided in two places spaced in the outer periphery direction, but may be formed in a single place or in three or more places. Furthermore, the through holes 24 and 25 and the grooves 31 are not particularly restricted in shape and placement and are required only to appropriately maintain strength and balance of weight of the core 11.

In the present embodiment, the through holes 24 for weight reduction and the through holes 25 for welding are provided in total eight places. The through holes 25 are designed with a shape continuous to a respective through hole 24 for weight reduction. As an alternative, those through holes 24 and 25 may be designed with different shapes from each other.

<Rotor Manufacturing Method>

A method of manufacturing the rotor 100 will be explained below. In this embodiment, the following five processes are performed to manufacture the rotor 100.

Figure 3:
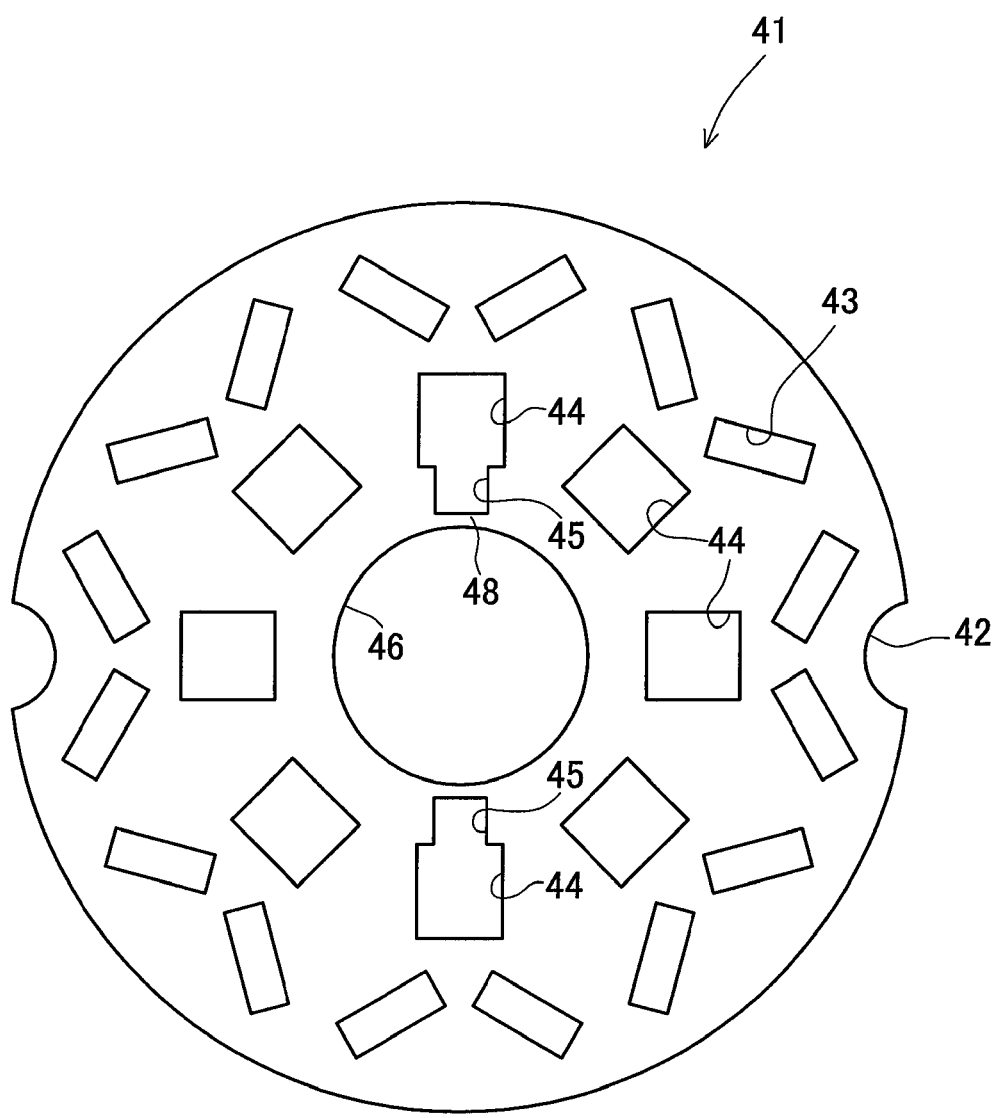
FIG. 3 is a view of a magnetic steel sheet in a rotor manufacturing process (a punching process)

(1) Punching process;
(2) Laminating process;
(3) Shaft inserting process;
(4) Outer-peripheral-side welding process; and
(5) Inner-peripheral-side welding process Firstly, in the punching process (1), a circular-plate-like magnetic steel sheet 41 is punched out of an original sheet roll as shown in FIG. 3. In this process, the steel sheets 41 having the same shape are produced by the number of sheets needed for a core 11. The steel sheets 41 correspond to the magnetic steel sheets 21 of the core 11. Each steel sheet 41 is simultaneously formed with through holes 43, 44, 45, and 46 by punching in positions corresponding to the through holes 23, 24, 25, and 26 of the core 11. In addition, cutouts 42 are simultaneously formed in positions corresponding to the grooves 31 of the core 11. In this stage, each steel sheet 41 includes bridges 48, corresponding to the bridge portions 28 of the core 11, between each through hole 45 and the through hole 46 as shown in the figure.

Secondly, in the laminating process (2), the desired number of the magnetic steel sheets 41 for the core 11 are laminated. At that time, the steel sheets 41 are laminated by aligning respective through holes 43, 44, 45, and 46. Accordingly, the through holes 43 of the steel sheets 41 overlap one another, forming the through holes 23. Similarly, the through holes 44, 45, and 46 of the steel sheets 41 overlap to form the through holes 24, 25, and 26 of the core 11 respectively. In addition, the cutouts 42 of the steel sheets 41 overlap to form the grooves 31 of the core 11. It is to be noted that the permanent magnets may be embedded in the resultant through holes 23 just after the above process or in a later process.

In the shaft inserting process (3), subsequently, the shaft 12 separately manufactured is inserted through the through hole 26 of the core 11 (through holes 46 of the steel sheets 41) until the shaft 12 is placed in an appropriate position.

Figure 4:
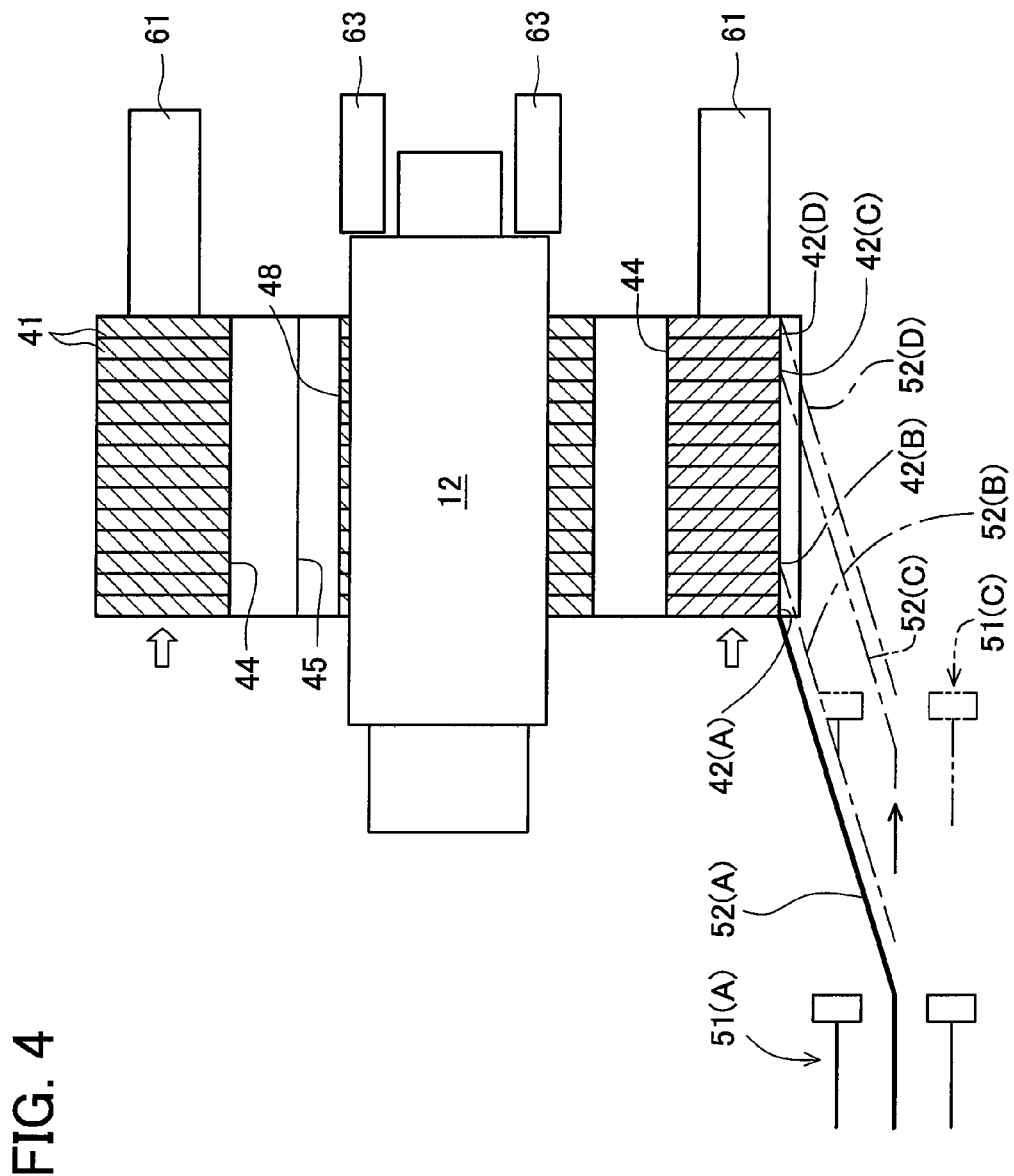
FIG. 4 is a view showing the rotor manufacturing process (an outer-peripheral-side welding process)

In the outer-peripheral-side welding process (4), as shown in FIG. 4, electron beam welding is conducted by use of an electron gun 51. In this process, the gun 51 is first placed in such a position that an electron beam 52 falls on a cutout 42(A) of the steel sheet 41 located on a lower end side in the laminating direction. The electron beam 52(A) is then irradiated and the beam-irradiated portion of the cutout 42(A) is melted. Further, the electron gun 51 is moved in the laminating direction from left to right in FIG. 4 while emitting the electron beam 52. When the irradiating spot of the electron beam 52 is moved by about 5 to 10 mm and reaches a cutout 42(B) located there, the steel sheets 41 forming a lower end part of the core 11 are welded to each other. That is, the outer-peripheral-side welded part 33 is formed. Here, welding is interrupted once.

Thereafter, the electron gun 51 is moved in the laminating direction and placed in such a position that the electron beam 52 falls on a cutout 42(C) located by about 5 to 10 mm short of the steel sheet 41 on an upper end side in the laminating direction. Then, irradiation of the electron beam 52 is started again. The portion exposed to the electron beam 52(C) is thus melted. The electron gun 51 is moved in the laminating direction while emitting the electron beam 52. When the electron beam 52 reaches a cutout 42(D) of the steel sheet 41 on the upper end side of the core 11, the steel sheets 41 forming an upper end part of the core 11 are welded to each other. That is, the outer-peripheral-side welded part 32 is formed. This welding on the outer peripheral side is repeated the number of times corresponding to the number of the outer-peripheral-side welded parts 32 and 33 to be formed. In the case where a plurality of electron guns 51 is used, the outer-peripheral-side welded parts 32 and 33 may be formed at the same time.

This welding process (4) is preferably performed by pressing some parts as shown in FIG. 4 in order to appropriately maintain the laminated relation of the magnetic steel sheets 41. For instance, it is preferable that jigs 61 are placed at a right end of the core 11 in the figure and a leftmost one of the steel sheets 41 is pressed from left to right (as indicated by blank arrows in FIG. 4) in the figure as indicated by hollow arrows. In this figure, furthermore, jigs 63 are also placed in contact with the shaft 12 to prevent displacement thereof. Alternatively, the core 11 may be entirely held or sandwiched in the laminating direction against displacement.

Figure 5:
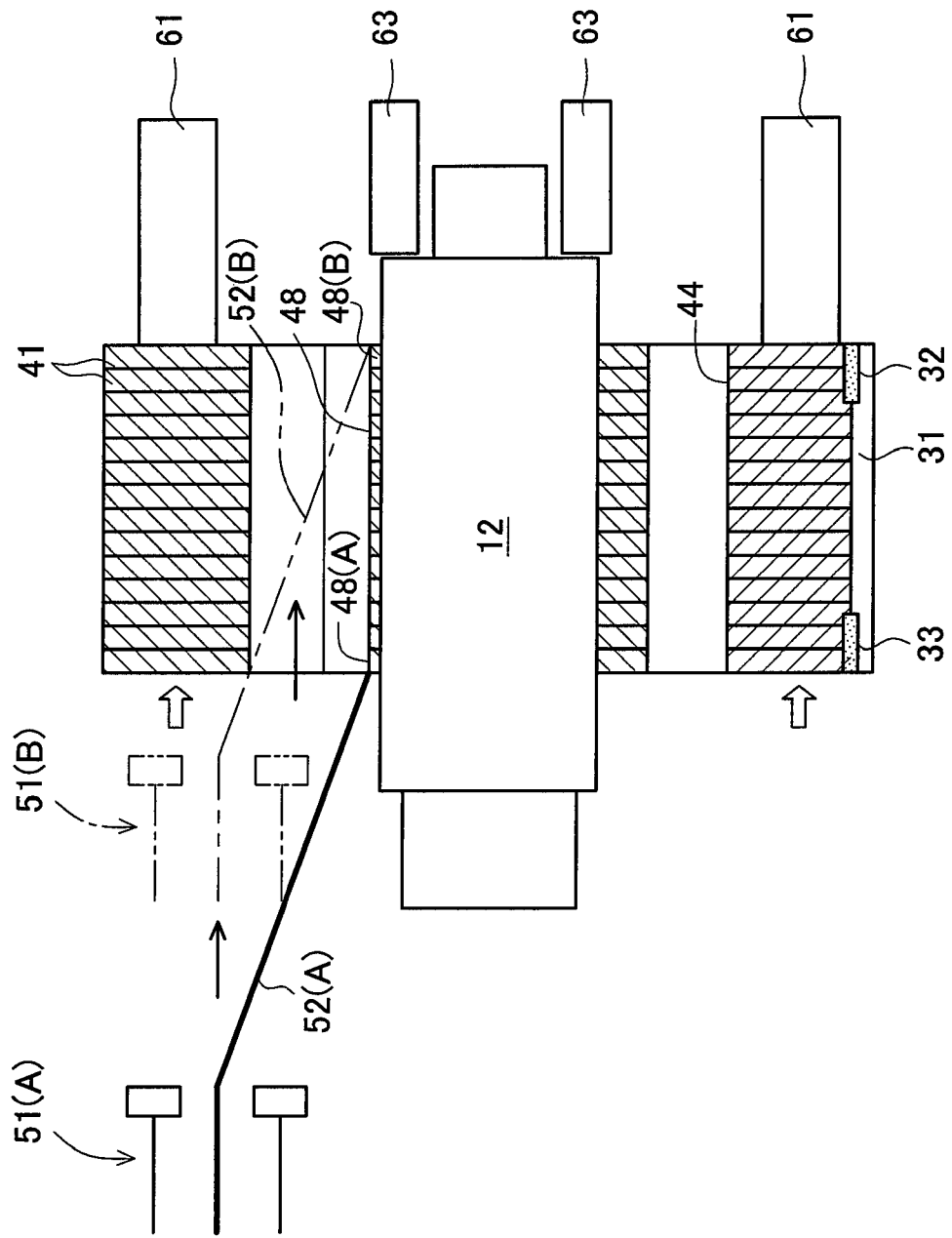
FIG. 5 is a view showing the rotor manufacturing process (an inner-peripheral-side welding process)

In the inner-peripheral-side welding process (5), subsequently, the electron beam welding is conducted by use of the electron gun 51 as shown in FIG. 5. In this process, firstly, the gun 51 is placed in such a position that the electron beam 52 falls on a bridge 48(A) of the steel sheet 41 of the lower end part. Then, the electron 52(A) is irradiated and the beam-irradiated portion of the bridge 48(A) is melted. A surrounding area thereof is also melted and then a melted area reaches the shaft 12. When this melted area is hardened, the steel sheets 41 are fixed to the shaft 12 through that hardened area.

The electron gun 51 is subsequently moved in the axial direction of the shaft 12 from right to left in FIG. 5 while emitting the electron beam 52. Herein, the incident direction of the electron beam 52 is determined within a plane defined by a radial direction of the core 11 and the axial direction of the shaft 12 in the through hole 25 for welding. Accordingly, the electron beam 52 is prevented from falling on any other portions than the bridges 48.

When the electron beam 52 reaches a bridge 48(B) of the magnetic steel sheet 41 of the upper end part, the bridges 48 of all the steel sheets 41 are welded to the outer peripheral surface of the shaft 12. That is, the inner-peripheral-side welded part 29 is formed. Accordingly, the steel sheets 41 of the core 11 are fixed to the shaft 12 respectively. This inner-peripheral-side welding is repeated by the number of times corresponding to the number of inner-peripheral-side welded parts 29 to be formed. In the case where a plurality of electron guns 51 is used, the inner-peripheral-side welded parts 29 may be formed at the same time.

In this inner-peripheral-side welding process (5), during welding at the initial position of the electron beam 51, the magnetic steel sheets 41 near the initial position (the lower end part of the core 11), i.e., the magnetic steel sheets 21, are heated by welding heat. Therefore, there is a concern that the steel sheets 41 may warp. In this embodiment, however, a part of the outer periphery of the lower end part of the core 11 is fixed by the outer-peripheral-side welded parts 33 and thus the steel sheets 41 are prevented from warping.

It is generally known that, in a welding operation, a welded state tends to become unstable in a welding start portion and a welding end portion. In particular, the welded state is likely to become unstable in the inner-peripheral-side welded parts 29 to weld the steel sheets 21 to the shaft 12. For the purpose of enhancing the joining quality of the core 11 over the laminating direction in the inner-peripheral-side welding process (5), it is therefore preferable to place those welding start end portion and welding end portion (hereinafter, referred to as a "bead unstable area") outside the core 11 in the laminating direction. However, if regions for bead unstable areas are provided outside the core 11, the reduction in size of the rotor 100 in the laminating direction is restricted.

Figure 6:
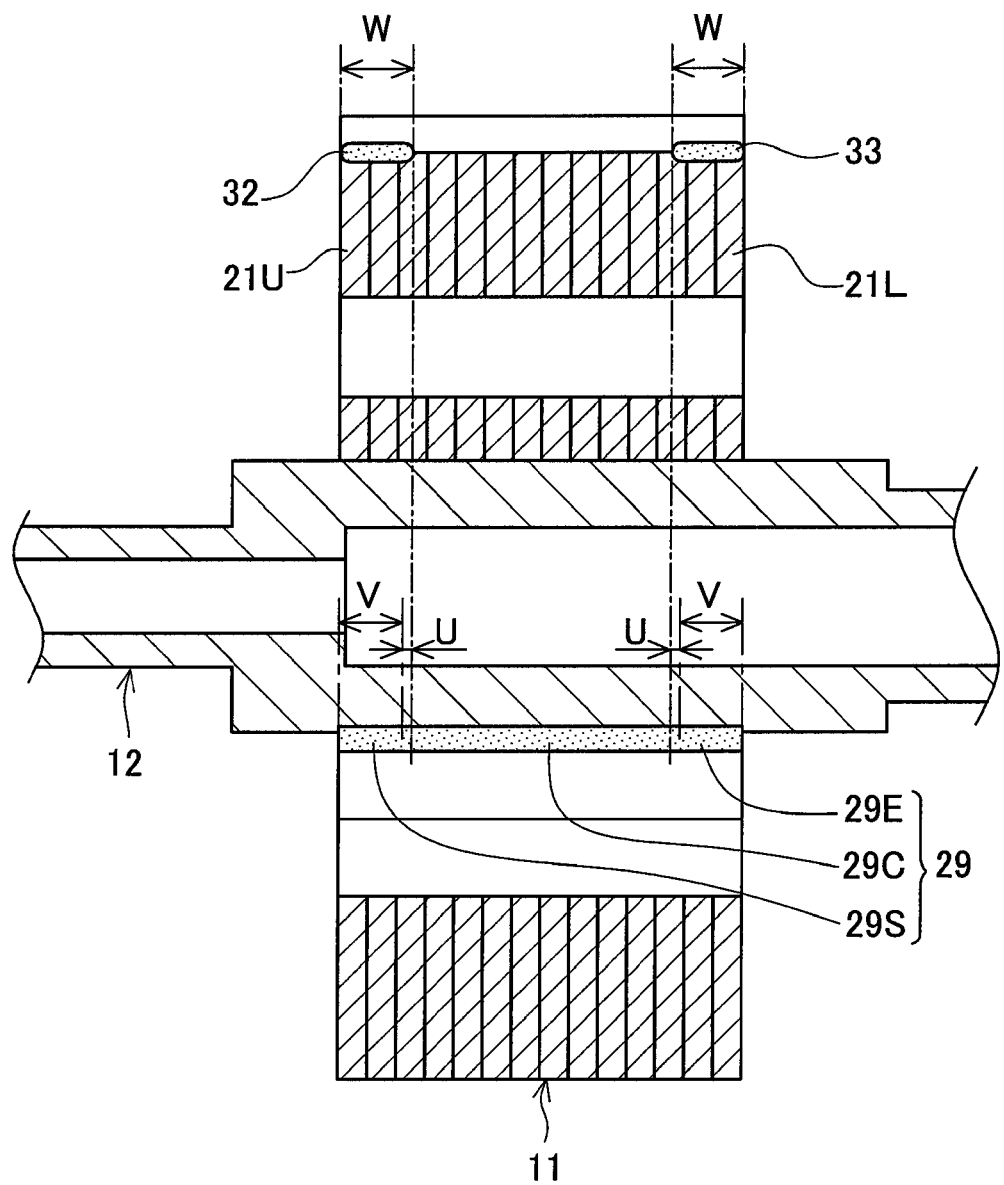
FIG. 6 is a view showing a positional relationship between an outer-peripheral-side welded part and a bead unstable area.

On the other hand, in the present embodiment, the bead unstable areas are arranged inside the core 11. This configuration can achieve the reduction in size. Specifically, in the inner-peripheral-side welding process (5), as shown in FIG. 6, the welding is conducted so that a bead unstable area 29S on a welding start side does not extend beyond the lower end of the core 11 and also a bead unstable area 29E on a welding end side does not extend beyond the upper end of the core 11. That is, each inner-peripheral-side welded part 29 completely falls within the core 11 in the laminating direction.

In this embodiment, even when the bead unstable areas 29S and 29E are provided within the core 11, the joining quality can be ensured. Specifically, in this embodiment, the magnetic steel sheets located in both end parts of the core 11 in the laminating direction are joined by the outer-peripheral-side welded parts 32 and 33 respectively. Even if the welding in both end parts of each inner-peripheral-side welded part 29 is unstable, the joining quality in the core 11 over the laminating direction can be ensured.

To be concrete, the length W of each of the outer-peripheral-side welded parts 32 and 33 in the laminating direction is determined to be longer than the length V of each of the bead unstable areas 29S and 29E of the inner-peripheral-side welded part 29. The welding is conducted so that the bead unstable area 29S overlaps the outer-peripheral-side welded part 32 and the bead unstable area 29E overlaps the outer-peripheral-side welded part 33 in a positional relation in the laminating direction of the core 11. The welding is also performed so that the outer-peripheral-side welded parts 32 and 33 overlap the bead stable area 29C of the inner-peripheral-side welded part 29 respectively (by a width U in FIG. 6; which is hereinafter referred to as an "overlap fixing region U") is present. Thus, the magnetic steel sheets joined by the bead unstable areas 29S and 29E are also surely joined by the outer-peripheral-side welded parts 32 and 33. Those steel sheets joined by the outer-peripheral-side welded parts 32 and 33 are further joined to the steel sheets 21 joined by the bead stable area 29C through the steel sheets 21 located in the overlap fixing regions U. Therefore, the steel sheets 21 are reliably joined to each other over the laminating direction. The middle part of the core 11 is surely joined to the shaft 12 by the bead stable area 29C and both ends parts of the core 11 are united with the shaft 12 through the middle part of the core 11. This eliminates welding instability attributable to the bead unstable areas 29S and 29E.

In the outer-peripheral-side welding process (4) and the inner-peripheral-side welding process (5), the electron gun 51 may be moved in a reverse direction, i.e., from (B) to (A). Instead of moving the electron gun 51, the emitting direction of the electron beam 52 may be changed so that appropriate portions is welded. An alternative is to fixedly hold the electron gun 51 and move the core 11 which is a workpiece and others. Further, the electron beam 52, which is irradiated all over the area from one end in the axial direction of the shaft 12, may be irradiated on halves from both ends.

In the case where a plurality of electron beams can be emitted, the outer-peripheral-side welding process (4) and the inner-peripheral-side welding process (5) may be conducted at the same time. As another alternative, it may be arranged that only the middle to upper parts of the core 11 in the laminating direction are welded in the outer-peripheral-side welding process (4) and the inner-peripheral-side welding process (5), and thereafter the outer-peripheral-side welding process (4) and the inner-peripheral-side welding process (5) are repeated to weld only the lower part.

In the aforementioned embodiment, the outer peripheral side of the core 11 is welded in the outer-peripheral-side welding process (4) and then the inner peripheral side is welded in the inner-peripheral-side welding process (5). This order of processes may be reverse. In this case, the welding start point and the welding end point are determined to be more inside than the end faces of the core 11 in order to avoid any influence of welding heat on the magnetic steel sheets forming the end faces of the core 11 in the laminating direction. That is, in the inner-peripheral-side welding process (5) which is conducted first, the steel sheets located in both end parts of the core 11 in the laminating direction are not welded. Accordingly, both end portions of the inner peripheral surface of the core 11 are less affected by the welding heat, thus preventing warping of the steel sheets 21U and 21L forming the end faces of the core 11 in the laminating direction. In the subsequent outer-peripheral-side welding process (4), the steel sheets 21 on the upper end side including the steel sheet 21U and the steel sheets 21 on the lower end side including the steel sheet 21L are welded respectively. At that time, the overlap fixing regions U are provided in which the outer-peripheral-side welded parts 32 and 33 overlap the bead stable area 29C in the laminating direction of the core 11. Consequently, the joining quality of the core 11 over the laminating direction can be ensured.

<Modified Examples of Rotor>

(First Modified Example of Rotor)

Figure 7:
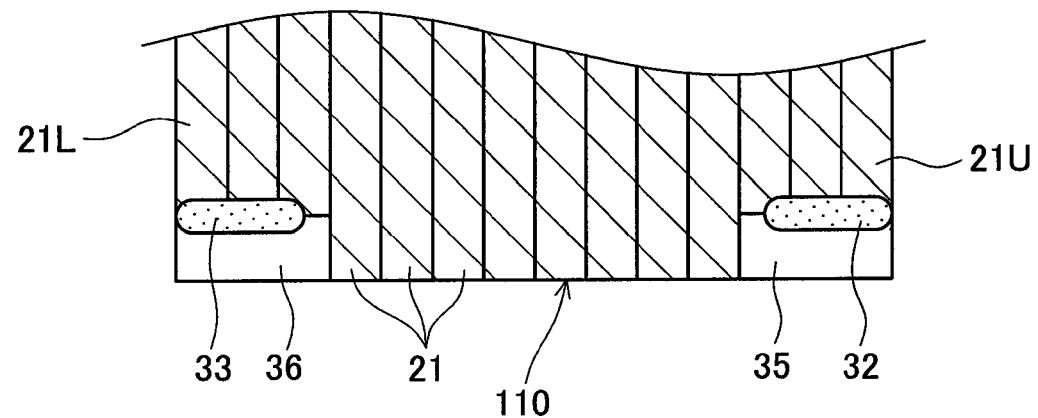
FIG. 7 is a cross sectional view of a core in a first modified example, in which grooves are formed in both end parts of the core in a laminating direction.

Modified examples of the rotor 100 will be explained below. A first modified example is related to a groove formed on the outer periphery of a core. A core 110 in this example is formed with grooves 35 and 36 only in both end parts in a laminating direction as shown in FIG. 7. This configuration is different from the core 11 formed with the grooves 31 extending over the laminating direction (see FIG. 2).

The core 110 shown in FIG. 7 is formed with the grooves 35 and 36 each having a length enough to receive the outer-peripheral-side welded part 32 or 33 in the end parts in the laminating direction. Specifically, of the magnetic steel sheets 21 constituting the core 110, several steel sheets counted from the upper end and several steel sheets counted from the lower end are formed, on a respective outer periphery, with cutouts corresponding to the groove 35 or 36. The remaining steel sheets 21 located in the middle part are formed with no cutouts.

With such a configuration that the grooves 35 and 36 formed long enough to receive the outer-peripheral-side welded parts 32 and 33 respectively, it is possible to minimize a change in shape of the outer periphery of the core 110. Therefore, the influence on an electromagnetic circuit is smaller as compared with the configuration with the grooves 31 extending over the laminating direction. The influence on power performance of the motor is also held down. On the other hand, the grooves 31 extending over the laminating direction can facilitate irradiation of an electron beam.

(Second Example)

Figure 8:
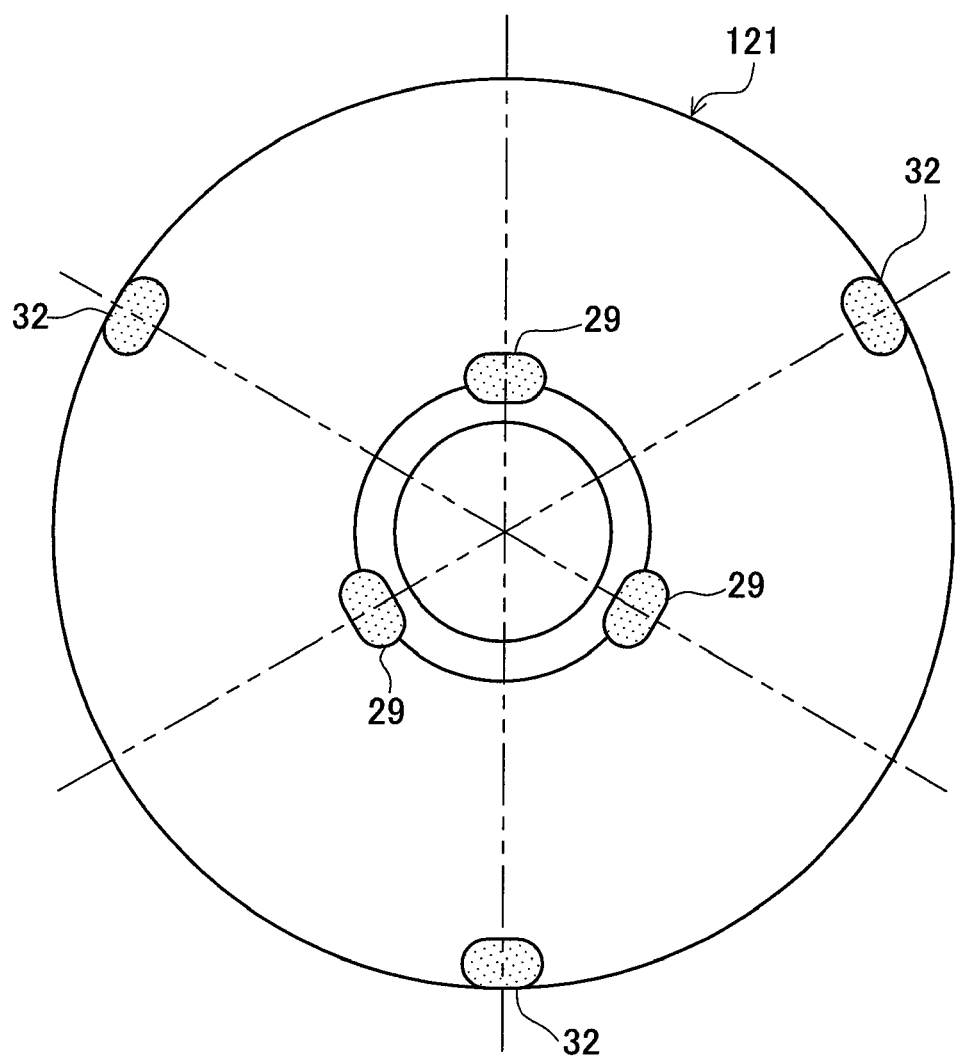
FIG. 8 is a schematic view showing a core in a second modified example, in which outer-peripheral-side welded parts and inner-peripheral-side welded parts are formed at respective three places.
Figure 9:
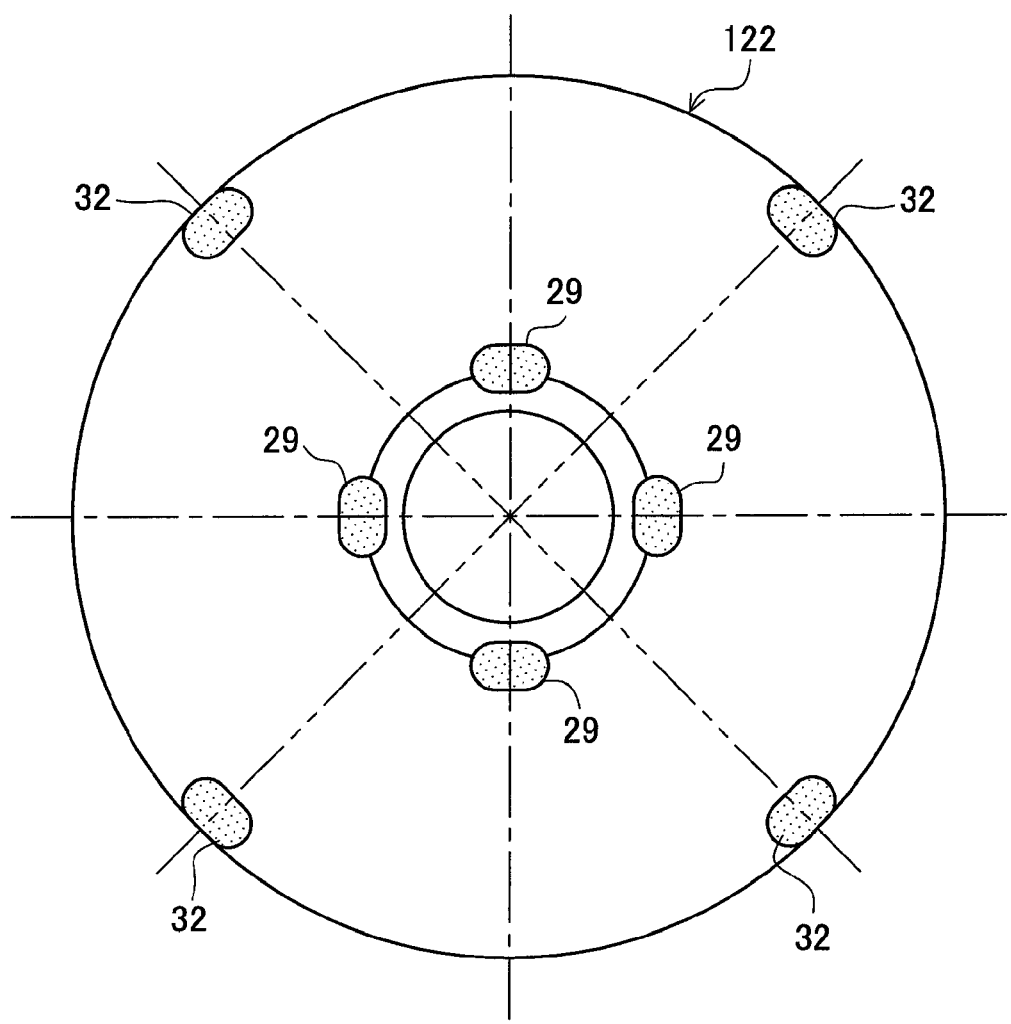
FIG. 9 is a schematic view showing a core in the second modified example, in which outer-peripheral-side welded parts and inner-peripheral-side welded parts are formed at respective four places.
Figure 10:
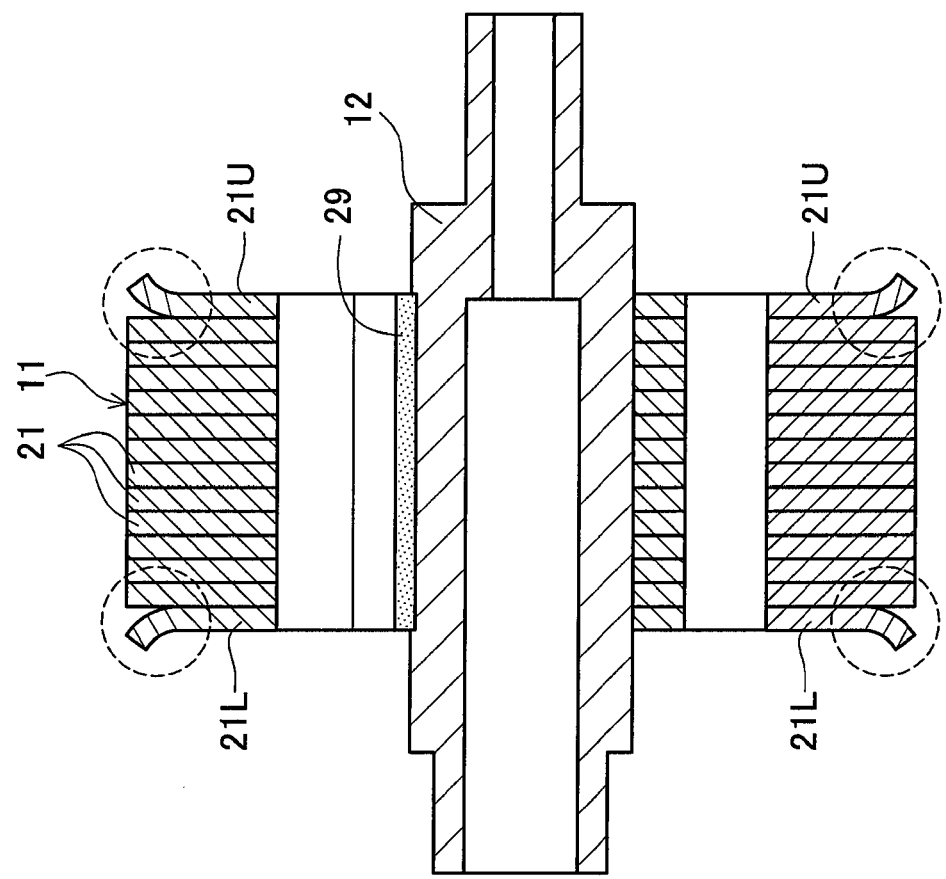
FIG. 10 is a view showing core widening of magnetic steel sheets.

A second modified example is configured such that the number of outer-peripheral-side welded parts and the number of inner-peripheral-side welded parts in a periphery direction are each three or more as shown in FIGS. 8 and 9. This configuration is different from the core 11 (see FIG. 2) in which the number of outer-peripheral-side welded parts and the number of inner-peripheral-side welded parts in the periphery direction are each two.

FIG. 8 shows a core 121 in which three outer-peripheral-side welded parts 32 and three inner-peripheral-side welded parts 29 are provided respectively in a periphery direction. FIG. 9 shows a core 122 in which four outer-peripheral-side welded parts 32 and four inner-peripheral-side welded parts 29 are provided in a periphery direction. The outer-peripheral-side welded parts 32 are arranged at equal intervals on the outer periphery of each of the cores 121 and 122. The inner-peripheral-side welded parts 29 are arranged at equal intervals on the inner periphery of each of the cores 121 and 122. Since the outer-peripheral-side welded parts 32 are arranged at equal intervals in the outer periphery direction, defects such as vibration resulting from the outer-peripheral-side welded parts 32 during rotor rotation can be reduced.

Further, in each core 121, 122, the outer-peripheral-side welded parts 32 are not disposed on a line extending radially from an inner-peripheral-side welded part 29 toward the outer periphery of the core 121 or 122. This configuration, that is, displacement of phase between the outer-peripheral-side welded parts 32 and the inner-peripheral-side welded parts 29 can also be expected to reduce defects such as vibration resulting from the welded areas.

In the second modified example, the cores 121 and 122 are each configured such that the outer-peripheral-side welded parts 32 are disposed on a line extending radially from a midpoint between the adjacent inner-peripheral-side welded parts 29 in the inner periphery direction toward the outer periphery of the core 11. In the periphery direction of the core 11, a region extending from the midpoint between the adjacent inner-peripheral-side welded parts 29 in the inner periphery direction toward the outer periphery is apt to most greatly warp. Therefore, the relevant regions are fixed by the outer-peripheral-side welded parts 32, so that warping of the steel sheets 21 can be prevented effectively.

Each of the welded areas may be arranged at five or more places as needed. As the number of welded areas is larger, the more reliably the joining quality can be ensured. The larger number of outer-peripheral-side welded parts 32 also can prevent warping of more areas in the periphery direction. On the other hand, the smaller number of outer-peripheral-side welded parts 32 can prevent the influence of welding heat.

As explained in detail above, the rotor 100 in the present embodiment is configured such that the inner-peripheral-side welded parts 29 located on the inner peripheral side of the rotor 100 join between the magnetic steel sheets 21 and join the steel sheets 21 to the shaft 12, thereby preventing all of the rotation between the steel sheets 21, the rotation between the core 11 and the shaft 12 about their axis, and the slippage or sliding of the core 11 in the laminating direction. Further, the outer-peripheral-side welded parts 32 and 33 located on the outer peripheral side of the rotor 100 join between the steel sheets 21 in each end part of the core 11 in the laminating direction by welding. That is, some of the steel sheets 21 including the steel sheet 21U (21L) forming the end face of the core 11 are joined to each other. This welding on the outer peripheral side can prevent the steel sheets 21 from warping and hence restraining the core opening. The outer-peripheral-side welded parts 32 and 33 extend in a part of the laminating direction, but not over the laminating direction. That is, the magnetic fluxes straddle the outer-peripheral-side welded parts 32 and 33 in a small number of places. Thus, the influence on the magnetic circuits of the outer-peripheral-side welded parts 32 and 33 is small, so that power performance of a motor is kept stable.

Further, the rotor 100 is configured so that the bead unstable areas 29S and 29E of the inner-peripheral-side welded parts 29 are located within the core 11 in the laminating direction. It is therefore expected to achieve the size reduction in the laminating direction. The steel sheets 21 located in both end portions including the bead unstable areas are fixed by the outer-peripheral-side welded parts 32 and 33, thereby ensuring the quality of an integrated state of the entire rotor 100.

The above embodiments are mere examples and do not impart any limitation to the present invention. The present invention may be embodied in other specific forms without departing from the essential characteristics thereof. For instance, the outer shape of the shaft 12 is not limited to be cylindrical but may be polygonal prism, spline, and others. Further, the shaft 12 and the core 11 may further include a key and a key groove which are engageable with each other. The shaft 12 may be formed with a flange for holding one end of the core 11 in the laminating direction. Moreover, the shaft 12 may be configured as a separation type.

Moreover, for example, the magnetic steel sheets of the core 11 may be fixed to each other in advance by bending, welding, adhering, resin molding, or other techniques. Further, the core 11 may be a split type core consisting of a plurality of core segments separated in a periphery direction.

In the present embodiment, the core 11 is fixed by welding to the shaft 12 over the laminating direction. It is accordingly unnecessary to place plate members in contact with end faces of the core 11 in the laminating direction or form a bent section in the shaft 12 and the steel sheets 21 to fix each component by means of other techniques than welding. However, those techniques may be used as needed to enhance the joining quality.

Further, the present invention is applicable not only to an interior permanent magnet (IPM) type motor but also an SPM type motor in which a magnet is placed on a rotor surface. The invention is also applicable not only to an inner rotor type but also an outer rotor type.

In the present embodiment, the shape of each cutout 42 formed on the outer periphery of the magnetic steel sheets 21 is arc-shaped but not limited thereto. For instance, it may be any shape, such as a triangle or a polygon, if only it can join between the magnetic steel sheets by welding.

Although the welding in the present embodiment is performed by electron beams, the welding may be conducted by arc welding, laser welding, or others.

DESCRIPTION OF THE REFERENCE SIGNS

11 Core
12 Shaft
14 Permanent magnet
21 Magnetic steel sheet
29 Inner-peripheral-side welded part
29S Bead unstable area (Welding start portion)
29E Bead unstable area (Welding end portion)
29C Bead stable area
31 Groove
32, 33 Outer-peripheral-side welded part
100 Rotor

The invention claimed is:
1. A rotor comprising:
a core made of a laminated steel sheet assembly including a plurality of laminated magnetic steel sheets each having a flat plate shape, the core being formed with a through hole at a rotation center;
a rotation transmitting member inserted in the through hole of the core;
an inner-peripheral-side welded part provided on an inner peripheral side of the core to join between the magnetic steel sheets constituting the laminated steel sheet assembly, the inner-peripheral-side welded part being a welded section that joins the laminated steel sheets to the rotation transmitting member over a laminating direction of the magnetic steel sheets; and an outer-peripheral-side welded part provided on an outer peripheral side of the core and at an end in the laminating direction, the outer-peripheral-side welded part being a welded section that joins between the steel sheets including a steel sheet forming an end face of the core in the laminating direction, the through hole for the rotation transmitting member being inserted defining a first through hole, and the core further being formed with a second through hole located adjacent to the first through hole, the first and second through holes extending over the laminating direction, and the inner-peripheral-side welded part being a welded section that joins a portion of the core between the first through hole and the second through hole to the rotation transmitting member.

2. The rotor according to claim 1, wherein the inner-peripheral-side welded part includes a welding start portion and a welding end portion both located within the core in the laminating direction.

3. The rotor according to claim 2, wherein the welding start portion and the welding end portion of the inner-peripheral-side welded part overlap the outer-peripheral-side welded part in a positional relation in the laminating direction.

4. The rotor according to claim 1, wherein the outer-peripheral-side welded part is provided in at least two places on the outer periphery of the core respectively so that the outer-peripheral-side welded parts are located at equal intervals in an outer periphery direction of the core.

5. The rotor according to claim 1, wherein the outer-peripheral-side welded part is not located on a line extending radially from the inner-peripheral-side welded part toward the outer peripheral side of the core.

6. The rotor according to claim 1, wherein the outer-peripheral-side welded part is located on a line extending radially from a midpoint between adjacent inner-peripheral-side welded parts in the inner periphery direction toward the outer peripheral side of the core.

7. The rotor according to claim 1, wherein
the core is formed with a groove extending in the laminating direction from the end face of the core in the laminating direction, and
the outer-peripheral-side welded part is located in the groove.

8. The rotor according to claim 1, wherein
the outer-peripheral-side welded part includes:
a first outer-peripheral-side welded part located on the outer peripheral side and at one end of the core in the laminating direction, the first outer-peripheral-side welded part being a welded section that joins between some of the magnetic steel sheets including the magnetic steel sheet forming one end face of the core in the laminating direction; and
a second outer-peripheral-side welded part located on the outer peripheral side and at the other end of the core in the laminating direction, the second outer-peripheral-side welded part being a welded section that joins between some of the magnetic steel sheets including the magnetic steel sheet forming the other end face of the core in the laminating direction.

9. A method of manufacturing a rotor including: a core made of a laminated steel sheet assembly including laminated magnetic steel sheets each having a flat plate shape and formed with a first through hole at a rotation center and a second through hole located adjacent to the first through hole; and a rotation transmitting member inserted in the first through hole of the core, the method comprising:

an outer-peripheral-side welding process of welding an outer peripheral side of the core in a laminating direction and joining between some of the magnetic steel sheets of the laminated steel sheet assembly, the joined magnetic steel sheets including a magnetic steel sheet forming an end face of the core in the laminating direction; and an inner-peripheral-side welding process of welding a portion between the first through hole and the second through hole of the core to the rotation transmitting member over the laminating direction to join between the steel sheets constituting the laminated steel sheet assembly and join the core to the rotation transmitting member.

10. The rotor manufacturing method according to claim 9, wherein the outer-peripheral-side welding process is performed after the inner-peripheral-side welding process.

11. The rotor manufacturing method according to claim 9, wherein the inner-peripheral-side welding process is performed after the outer-periphery-welding process.

12. The rotor according to claim 4, wherein the outer-peripheral-side welded parts are not located on a line extending radially from the inner-peripheral-side welded part toward the outer peripheral side of the core.

13. The rotor according to claim 4, wherein the outer-peripheral-side welded parts are located on a line extending radially from a midpoint between adjacent inner-peripheral-side welded parts in the inner periphery direction toward the outer peripheral side of the core.

14. The rotor according to claim 4, wherein
the core is formed with grooves each extending in the laminating direction from the end face of the core in the laminating direction, and
the outer-peripheral-side welded parts are located in the grooves.

15. The rotor according to claim 4, wherein
each of the outer-peripheral-side welded parts includes:
a first outer-peripheral-side welded part located on the outer peripheral side and at one end of the core in the laminating direction, the first outer-peripheral-side welded part being a welded section that joins between some of the magnetic steel sheets including the magnetic steel sheet forming one end face of the core in the laminating direction; and
a second outer-peripheral-side welded part located on the outer peripheral side and at the other end of the core in the laminating direction, the second outer-peripheral-side welded part being a welded section that joins between some of the magnetic steel sheets including the magnetic steel sheet forming the other end face of the core in the laminating direction.

* * * * *